(12) United States Patent
Poirier et al.

(10) Patent No.: US 12,150,417 B2
(45) Date of Patent: Nov. 26, 2024

(54) SYSTEMS AND METHODS FOR MANAGING UNDESIRED EFFECTS PRODUCED BY HORTICULTURAL LIGHTING SOURCES IN AN ELECTRICAL GRID

(71) Applicant: SOLLUM TECHNOLOGIES INC., Montreal (CA)

(72) Inventors: Jacques Poirier, Montreal (CA); Marc Tremblay, Montreal (CA); François Roy-Moisan, Montreal (CA); Gabriel Dupras, Montreal (CA); Florence Longpré, Montreal (CA)

(73) Assignee: SOLLUM TECHNOLOGIES INC., Montreal (CA)

( * ) Notice: Subject to any disclaimer, the term of this patent is extended or adjusted under 35 U.S.C. 154(b) by 0 days.

(21) Appl. No.: 17/865,830

(22) Filed: Jul. 15, 2022

(65) Prior Publication Data

US 2023/0021277 A1    Jan. 19, 2023

Related U.S. Application Data

(60) Provisional application No. 63/267,855, filed on Feb. 11, 2022, provisional application No. 63/203,304, filed on Jul. 16, 2021.

(51) Int. Cl.
*A01G 7/04*     (2006.01)
*H05B 45/59*    (2022.01)
(Continued)

(52) U.S. Cl.
CPC ............ *A01G 7/045* (2013.01); *H05B 45/59* (2022.01); *H05B 47/14* (2020.01); *H05B 47/20* (2020.01)

(58) Field of Classification Search
CPC ........ A01G 7/045; H05B 45/59; H05B 47/14; H05B 47/20; H02J 3/00125; H02J 3/002; H02J 3/14; H02J 3/46
See application file for complete search history.

(56) References Cited

U.S. PATENT DOCUMENTS 10,938,204 B1 *  3/2021  Carty .................. G01R 31/327
2015/0305108 A1  10/2015  Probasco
(Continued)

FOREIGN PATENT DOCUMENTS

| CA | 3062229 C   | * 4/2020  | ............. A01G 7/045 |
| CN | 102821594 A | * 12/2012 | ............. A01G 7/045 |

(Continued)

OTHER PUBLICATIONS

Dutch Application No. NL2032506, Search Report mailed May 31, 2023, 11 pages.

(Continued)

*Primary Examiner* — Abdullah A Riyami
*Assistant Examiner* — Syed M Kaiser
(74) *Attorney, Agent, or Firm* — Conley Rose, P.C.

(57) ABSTRACT

The present techniques generally concern methods and systems for managing undesired effects in an electrical grid, which may include rapid voltage change(s) and/or flicker(s). The system includes an event detection module operatively connected to a plurality of horticultural light sources. The event detection module is configured to determine a power usage of the horticultural light sources, based on illumination conditions, detect an event affecting the illumination conditions, determine whether the event causes the undesired effects in the electrical grid, based on an evolution of the power usage of the horticultural light sources in response to the event, and send illumination instructions to the horticultural light sources to adjust the power usage of the (Continued)

horticultural light sources, if the event causes the undesired effects.

17 Claims, 4 Drawing Sheets

(51) Int. Cl.
*H05B 47/14* (2020.01)
*H05B 47/20* (2020.01)

(56) References Cited

U.S. PATENT DOCUMENTS

| | | |
|---|---|---|
| 2016/0365726 A1 | 12/2016 | Bamberger |
| 2017/0223807 A1* | 8/2017 | Recker ............... H02J 7/34 |
| 2019/0098725 A1* | 3/2019 | Sadwick .............. F21S 2/00 |
| 2020/0039367 A1* | 2/2020 | Lyden ................ B60L 53/51 |
| 2020/0389957 A1 | 12/2020 | Maji et al. |
| 2021/0126461 A1 | 4/2021 | Poojary et al. |
| 2021/0360867 A1 | 11/2021 | Goettle |

FOREIGN PATENT DOCUMENTS

| | | | | |
|---|---|---|---|---|
| CN | 108370634 A | * | 8/2018 | ............ H02J 9/061 |
| CN | 109103923 A | * | 12/2018 | |
| CN | 111244946 A | * | 6/2020 | ............... H02J 3/00 |
| CN | 113966518 A | * | 1/2022 | ........... A01B 79/005 |
| JP | 2009171857 A | * | 8/2009 | |
| WO | 2016119063 A1 | | 8/2016 | |
| WO | WO-2021251375 A1 | * | 12/2021 | ............ B60Q 1/076 |

OTHER PUBLICATIONS

Dutch Application No. NL2032507, Search Report mailed May 31, 2023, 7 pages.

U.S. Appl. No. 17/865,817, Office Acton mailed Oct. 5, 2023, 24 pages.

U.S. Appl. No. 17/865,817, Notice of Allowance mailed May 1, 2024, 14 pages.

* cited by examiner

SYSTEMS AND METHODS FOR MANAGING UNDESIRED EFFECTS PRODUCED BY HORTICULTURAL LIGHTING SOURCES IN AN ELECTRICAL GRID

TECHNICAL FIELD

The technical field generally relates to horticultural lighting, and more particularly concerns methods and systems for managing undesired effects that may be generated by horticultural light sources in an electrical grid.

BACKGROUND

Artificial light sources may be used in horticulture or agriculture to assist or promote the growth of plants or crops, which may be particularly useful in a horticultural structure such as a greenhouse.

The horticultural structures are generally equipped with a plurality of horticultural lighting apparatuses connected to an electrical grid. The operation of the horticultural light sources may have undesired impacts on the electrical grid. For example, the operation parameters of the horticultural light sources, or their variations, may negatively impact the electrical grid.

There remains a need for systems and methods that can provide improvements in methods and systems for controlling horticultural lighting sources, as well as their potential undesirable or unwanted effects in the electrical grid, especially in the context of horticultural structure including a relatively large number of horticultural light sources.

SUMMARY

The present techniques generally concern methods and systems for managing undesired effects produced by horticultural light sources in an electrical grid. The techniques provided herein include determining the impacts of an event affecting the illumination conditions and based on a temporal evolution of the power consumption of the horticultural light sources, determine if the event may be associated with the undesired effects in the electrical grid. If the event is associated with the undesired effects, then the techniques include sending illumination instructions to the horticultural light sources to adjust the power usage of the horticultural light sources. The techniques described herein allow reducing, mitigating, or eliminating the negative effects generally associated with the operation of horticultural light sources in the electrical grid, and the variations of their power usage or consumption.

In accordance with one aspect, there is provided a system for managing undesired effects in an electrical grid. The system includes a plurality of horticultural lights sources operatively connected to the electrical grid, and an event detection module operatively connected to the plurality of horticultural light sources. The event detection is configured to determine a power usage of the plurality of horticultural light sources, the power usage being based on illumination conditions, detect an event affecting the illumination conditions, determine whether the event causes the undesired effects in the electrical grid, based on an evolution of the power usage of the plurality of horticultural light sources in response to the event, and send illumination instructions to the plurality of horticultural light sources to adjust the power usage of the plurality of horticultural light sources, if the event causes the undesired effects.

In some embodiments, the undesired effects include at least one rapid voltage change.

In some embodiments, the undesired effects include at least one flicker.

In some embodiments, the undesired effects are determined based on requirements of the electrical grid.

In some embodiments, the requirements of the electrical grid include at least one target associated with power-line flickers.

In some embodiments, the requirements of the electrical grid include at least one target associated with rapid voltage changes.

In some embodiments, the illumination instructions cause a gradual load flattening.

In some embodiments, the illumination instructions cause a decrease or a reduction of the power usage of at least one horticultural source from the plurality of horticultural light sources.

In accordance with another aspect, there is provided a method for managing undesired effects in an electrical grid. The method includes determining, with an event detection module operatively connected to a plurality of horticultural light sources, a power usage of the plurality of horticultural light sources, the power usage being based on illumination conditions; detecting an event affecting the illumination conditions; determining whether the event causes the undesired effects in the electrical grid, based on an evolution of the power usage of the plurality of horticultural light sources in response to the event, and sending illumination instructions to the plurality of horticultural light sources to adjust the power usage of the plurality of horticultural light sources, if the event causes the undesired effects.

In some embodiments, the undesired effects include at least one rapid voltage change.

In some embodiments, the undesired effects include at least one flicker.

In some embodiments, the undesired effects are determined based on requirements of the electrical grid.

In some embodiments, the requirements of the electrical grid include at least one target associated with power-line flickers.

In some embodiments, the requirements of the electrical grid include at least one target associated with rapid voltage changes.

In some embodiments, the illumination instructions cause a gradual load flattening.

In some embodiments, the illumination instructions cause a decrease or a reduction of the power usage of at least one horticultural source from the plurality of horticultural light sources.

In accordance with another aspect, there is provided a non-transitory computer readable storage medium having stored thereon computer executable instructions that, when executed by a processor, cause the processor to perform the methods herein disclosed, or at least one step of the method.

Other features and advantages of the method and system described herein will be better understood upon a reading of preferred embodiments thereof with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
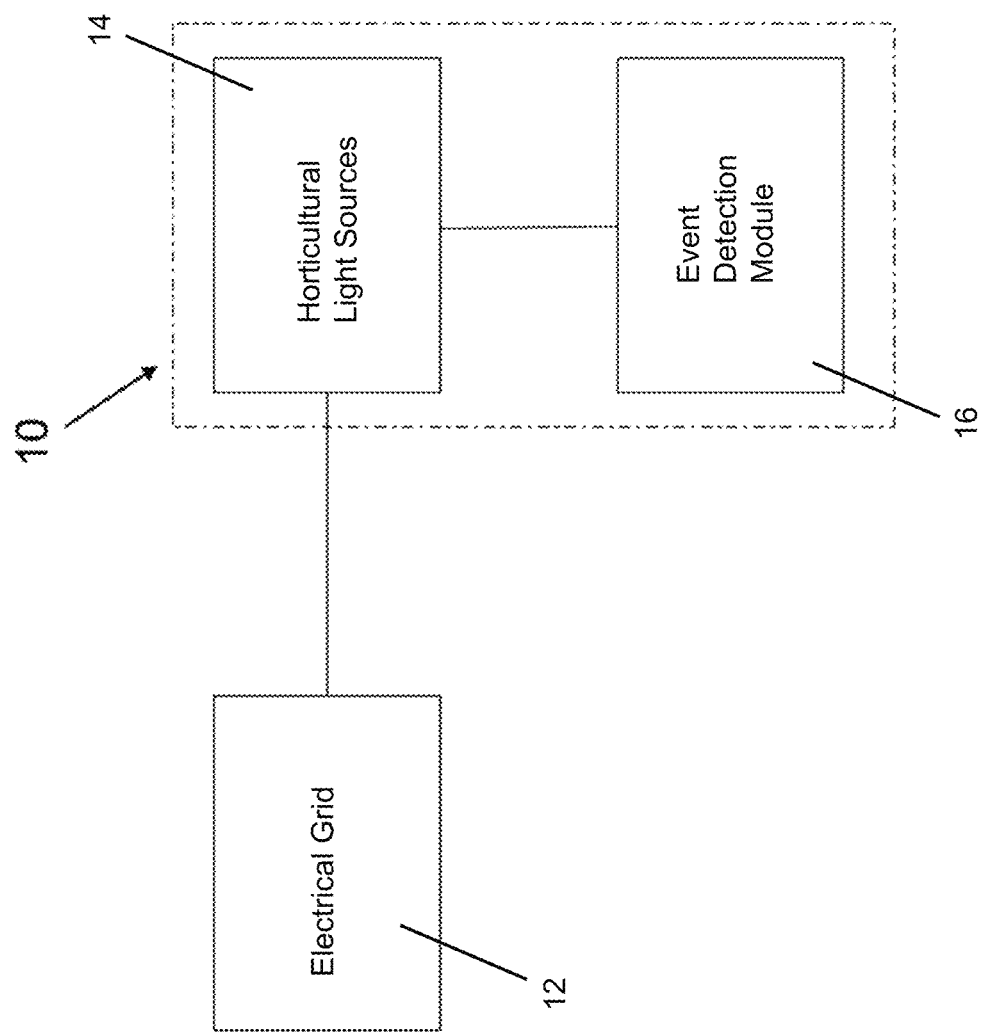
FIG. 1 shows a system for managing undesired effects in an electrical grid, in accordance with one embodiment.

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements may be acoustical, mechanical, optical, electrical, thermal, logical, or any combinations thereof.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

The term "computer" (or "computing device") is used to encompass computers, servers and/or specialized electronic devices which receive, process and/or transmit data. Computers are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is, of course, chosen according to the desired use, whether it should retain instructions, or temporarily store, retain or update data.

One skilled in the art will therefore understand that each such computer typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computers. Where a computer system includes multiple computers these devices can, but need not, be co-located. In some embodiments, a computer system can be a cloud-based computing system whose processing resources are shared by multiple distinct business entities or other users.

It should be noted that, in the context of the current disclosure, the expression "plants or crops" may encompass a broad variety of multicellular organisms, including photosynthetic eukaryotes. Non limitative examples of plants or crops are seedlings, ornamental crops, ornamental plants, plugs, liners, fruits, small fruits, vegetables, leafy greens, herbs, young plants, high-value crops, and many others. The plants or crops may be produced for human food, non-human food or non-food applications. The growing process of the plants or crops generally includes a plurality of subsequent plant growth stages, such as, for example, seed germination (or "sprout"), seedling, vegetative, bud stage (or "budding"), flowering and ripening. It should be understood that, in the present description, the plants or crops can be at any one of the plant growth stages or at a transition between any two subsequent growth stages.

The expression "horticultural light", synonyms and derivatives thereof will be used throughout the present disclosure, and refers to the use of optical techniques, systems, and methods for assisting, maintaining, stimulating and/or optimizing plants or crops growth. The horticultural light may irradiate or illuminate the plants or crops during any one of the plant growth stages. The horticultural light, which is the light generated by the horticultural lighting apparatus, may be produced or generated using an artificial light source or similar devices, apparatuses, and systems. Non-limiting examples of artificial light sources include incandescent light sources, fluorescent light sources, high-intensity discharge (HID) light sources such as mercury vapor, metal halide (MH), high-pressure sodium (HPS) and low-pressure sodium (LPS) light sources, solid-state light sources including LED light sources, and laser sources. The horticultural light is associated with an illumination spectrum or profile. In some implementations, the horticultural light produced by the horticultural lighting apparatus have a profile substantially similar to light reaching the crop or plant. The expression "illumination spectrum" is used to broadly refer to the spectral power distribution of an illumination. The illumination spectrum can represent the distribution of power radiated per unit area and per unit wavelength or frequency over a spectral region of the electromagnetic spectrum. It should be noted that using horticultural light may be used to irradiate or illuminate plants or crops growing in a horticultural structure providing regulated climatic conditions to the plants or crops. Non-limitative examples of horticultural structures include greenhouse, glasshouse and hothouse.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 250 nm to about 2500 nm. However, this range is provided for illustrative purposes only and some implementations of the present techniques may operate outside this range. Also, the skilled person will appreciate that the definition of the ultraviolet, visible and infrared ranges in terms of spectral ranges, as well as the dividing lines between them, can vary depending on the technical field or the definitions under consideration, and are not meant to limit the scope of applications of the present techniques.

The expressions "natural light" or "natural light conditions" generally refer to light having spectral characteristics corresponding or similar to those of sunlight, moonlight or starlight. The spectral profile of natural light, particularly sunlight, varies as a function of geographic location, time of day, time of year, weather, cloud coverage, and several other factors. Several standards are known in the art to provide a spectral reference for natural light. For example, the Commission internationale de l'éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation.

Accordingly, standard illuminants extend within the solar radiation spectrum. For example, Standard Illuminant D65 extends from 300 nm to 830 nm. Non-limiting examples of natural light sources include sunlight, moonlight, starlight, twilight, lightning, and firelight.

In the present description, the term "solid-state light emitter" refers to any light-emitting device that converts electrical energy into electromagnetic radiation through the recombination of electronic carriers (i.e., electrons and holes) in a light emitting layer or region. The emitting layer or region can include, but is not limited to, silicon, silicon carbide, gallium nitride and/or other semiconductor materials, and may or may not include a substrate such as sapphire, silicon, silicon carbide and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical cavity surface emitting lasers (VCSELs), other semiconductor light emitting devices or lamps, organic light-emitting diodes (OLEDs), and polymer light-emitting diode (PLEDs).

The expression "lighting scenario" is understood to refer to the generation of light, such as for illuminating purposes, according to predetermined optical characteristics (e.g., spectral content, intensity, polarization) that vary or evolve over time during a given time period. The optical characteristics of the generated light may correspond to or emulate those of natural lighting conditions. The natural light may emulate or be inspired from the actual light conditions experienced at a specific geographical location, date and time. It is appreciated that devising lighting scenarios that combine natural light conditions corresponding to different geographical locations is possible in some applications (e.g., a scenario could be build using sunrise, midday and sunset conditions corresponding to three distinct locations on Earth, at the same or different dates). In other embodiments, however, the natural light conditions may be different from real life conditions on Earth. By way of example, the spectrum of natural light generated according to the method described herein may differ from an actual spectral content of sunlight due to the absence of spectral components which are undesired or unnecessary in a given application context, or conversely by the enhancement or addition of wavelengths then are considered advantageous or required. The present techniques may rely on the use of solid-state light emitters. The solid-state light emitters can be driven to produce the lighting scenario using sets of control parameters. It should be noted that a plurality of lighting scenarios may be combined to collectively determine a "recipe" or a "recipe bundle". The recipe or the recipe bundle refers to a sequence of lighting scenarios.

In some embodiments, the lighting scenario may emulate lighting conditions over the course of a day, from dawn to dusk, or over a portion of a day. Indeed, the spectral contents of light reaching a particular location on earth from the Sun is not constant as the day progress. In some instances, it can be customary to characterize natural light according to its Correlated Color Temperature (CCT) value, expressed in Kelvin (K). By convention, the CCT is defined by the CIE as "the temperature of the Planckian radiator whose perceived color most closely resembles that of a given stimulus at the same brightness and under specified viewing conditions" (CIE/IEC 17.4:1987, International Lighting Vocabulary). Lower CCT values correspond to "warmer" light. Hence, a day with a clear blue sky can begin at dawn with light in a warm CCT spectrum range, such as between 1500K and 3000K, then progress to about 5000K to 7500K at mid-day and return to the 1500K to 3000K range towards dusk. In horticultural or agricultural applications, the light conditions in a region of the world from which a cultivated produce originates or where this produce is known to thrive can be emulated (e.g., growing tomatoes using light conditions from a sunny day in June in Tuscany). In other examples, the lighting conditions may be adapted in view of observations or discoveries regarding optimal or enhanced lighting conditions for growing a given agricultural output, such as for example to follow the McCree Curve, which represents the average photosynthetic response of plants to light energy.

The expression "undesired effects" will be used throughout the current disclosure to refer to potentially negative, unwanted and/or undesired impacts in the electrical grid that may be caused by the operation of the horticultural light sources (e.g., lamps). Nonlimitative examples of undesired effects include flicker(s) and rapid voltage change(s) (RVC). The expression "flicker" typically refers to the physiological discomfort experienced by humans as a result of sudden changes in lighting brightness. When a certain frequency is reached, the human eyes can perceive these changes in brightness, which can be associated with small variations in voltage. For example, flickers could be due to repetitive voltage variations caused by a group of horticultural light sources. The expression "RVC" typically refers to a sudden change of the supply voltage level, which may last a few seconds. The amplitude of RVCs is typically relatively small. RVCs may be caused by the load variations or equipment switching in the system.

The present description generally relates to methods and systems for managing undesired effects, such as flicker(s) and/or RVC(s) produced by horticultural light sources in an electrical grid. The techniques provided herein include determining the impacts of an event affecting the illumination conditions and based on a temporal evolution of the power consumption of the horticultural light sources, determine if the event may be associated with the undesired effects in the electrical grid. If the event is associated with the undesired effects, then the techniques include sending illumination instructions to the horticultural light sources to adjust the power usage of the horticultural light sources to mitigate potential undesired effects in the electrical grid associated with that event. The techniques described herein allow reducing, mitigating or eliminating the negative effects generally associated with the operation of horticultural light sources on the electrical grid, and the variations of their power usage or consumption.

There is provided a system 10 for managing undesired effects in an electrical grid 12. Broadly described, the system 10 includes a plurality of horticultural light sources 14 (globally referred to as the "horticultural light sources" or a "pool of lamps") and an event detection module 16. Of note, the undesired effects may include at least one RVC and/or at least one flicker. In some embodiments, the undesired effects may be determined based on requirements of the electrical grid 12. In some embodiments, the requirements of the electrical grid 12 include at least one target associated with power-line flickers and/or at least one target associated with rapid voltage changes.

The horticultural light sources 14 are operatively connected to the electrical grid 12. The expression "electrical grid" will be used throughout the description to refer to an interconnected network configured to deliver electricity from an electricity-generating facility towards a consumption point. The electricity-generating facility may be referred to as a power station, a power plant, a generating station, or a generating plant. The consumption point may be of various types and configurations and may for example be embodied by a horticultural structure or a plurality of interconnected horticultural structures.

In some embodiments, the horticultural light sources 14 may be embodied by a lamp similar to the lighting system described in WO 2016119063, the content of which is incorporated herein by reference.

The event detection module 16 is operatively connected to the horticultural light sources 14. The event detection module 16 may include or may be operatively connected to one or more controller(s), processor(s), and/computer(s) and is configured to perform a series of steps that will be described in greater detail later.

The event detection module 16 is configured to determine a power usage of the horticultural light sources 14. The expression "power usage" herein refers to the power consumption, i.e., the electricity or energy being used by the horticultural light sources 14 to maintain their operation. In some embodiments, the power usage may be determined, measured, detected, reported, and/or estimated. In some embodiments, the evaluation of the power usage may be performed in real time, near real time or at predetermined intervals. In some embodiments, the predetermined intervals may be synchronized or at least partially timed with a photoperiod or a portion thereof.

The determination of the power usage is based on illumination conditions. The expression "illumination conditions" may refer to past, present and/or future illumination conditions. The illumination conditions may be a combination of the outdoor illumination conditions, the illumination being provided within the horticultural structure with the horticultural light sources 14, and other parameters.

In the case of horticultural light sources including LEDs or similar technologies, it should be noted that the LEDs generally represent a significant portion of the power usage of the horticultural light sources 14. If the horticultural light sources 14 have an adjustable spectral power distribution (SPD), the power consumed by the LEDs may change according to the spectral profile required to obtain a predetermined SPD, i.e., the power usage of a horticultural light source can change over time. The power used by each LED affects the collective power usage of the horticultural light sources 14. As there is a correlation between the target SPD, the LEDs power usage and the horticultural light sources power usage, it is possible to determine, estimate, predict, report and/or measure the power usage of the horticultural light sources from the LEDs power consumption.

In the context of the current disclosure, the expression "spectral quantum distribution" may refer to a quantity expressed in µmol/s/nm ("horticultural interpretation") or W/nm ("human-based interpretation"). These terms will be used to describe the composition or content of the light leaving the horticultural light sources (or fixture) per wavelength. It should be noted that these expressions are generally independent from time, direction or intensity information, and so generally exclusively concern the spectral content of the light. The quantum units are typically used in horticultural design because the biological mechanisms of the plants or crops are generally affected by delivered photons, and not watts.

The event detection module 16 is further configured to detect an event affecting the illumination conditions, or that may potentially affect the illumination conditions. Such events may include, for example, and without being limitative, transitions between two subsequent illumination conditions during a recipe or a scenario, passage of a cloud, sunset, sunrise, and any other phenomena that may affect the illumination conditions within the horticultural structure.

Once the event has been detected, the event detection module 16 can determine whether the event causes the undesired effects, or if the event could potentially lead to undesired effects in the electrical grid 12. This determination may be based on an evolution or a change of the power usage of the horticultural light sources 14. In some embodiments, the event detection module 16 is configured to track the power usage of the horticultural light sources 14 and provide a temporal profile of the power usage of the horticultural light sources 14, or any other representation(s) of the evolution of the power usage of the horticultural light sources 14 over time. The event detection module 16 may be configured to continuously or semi-continuously track the power usage of the horticultural light sources 14 and identify properties of the temporal profile of the power usage that can be related to undesired effects, such as flicker(s) and/or RVC(s). Non-limitative examples of properties includes amplitude, frequency, baseline, drift, increase, decrease, the slope and unexpected variations of the temporal profile of the power usage of the horticultural light sources 14. In some embodiments, the power usage and/or the temporal profile may be stored in the event detection module 16 or in a separated memory and remain accessible to the event detection module 16 for future reference.

The event detection module 16 is further configured to send illumination instructions to the horticultural light sources 14 to adjust the power usage of the plurality of horticultural light sources 14, if the event causes the undesired effects.

The event detection module 16 may be configured to predict future events affecting the illumination conditions and compare these predictions with a target power usage or requirements of the electrical grid, which may be implemented as a rule or a set of rules. If the predicted power usage falls outside a predetermined range associated with the requirements of the electrical grid, then the event detection module 16 can send illumination instructions to the horticultural light sources 14 to cause an adjustment of the power usage of the horticultural light source 14 to meet the requirements of the electrical grid 12.

In some embodiments, the power usage may be estimated. Estimating the power usage may include obtaining the horticultural light sources 14 power usage profile and based on that information, estimating the LEDs power usage for a predetermined SPD. In other embodiments, the power usage may be measured. The measurement includes using a power measurement circuit, which may for example be provided on the horticultural light sources 14. The power measurement circuit may be configured to measure in real time or near real time the power usage.

The illumination instructions may include generating a control signal sent towards at least one of the horticultural light sources 14. In some embodiments, the event detection module 16 may be configured to receive inputs representative of measured data and/or estimated data, which can be used to generate the control signal.

In some embodiments, the system 10 may be configured to detect of one or more signals representative of the horticultural environment. For example, the signals may be representative of changing climatic conditions in the horticultural environment and adjusting the power factor based on the signal(s) representative of the horticultural environment.

Figure 2:
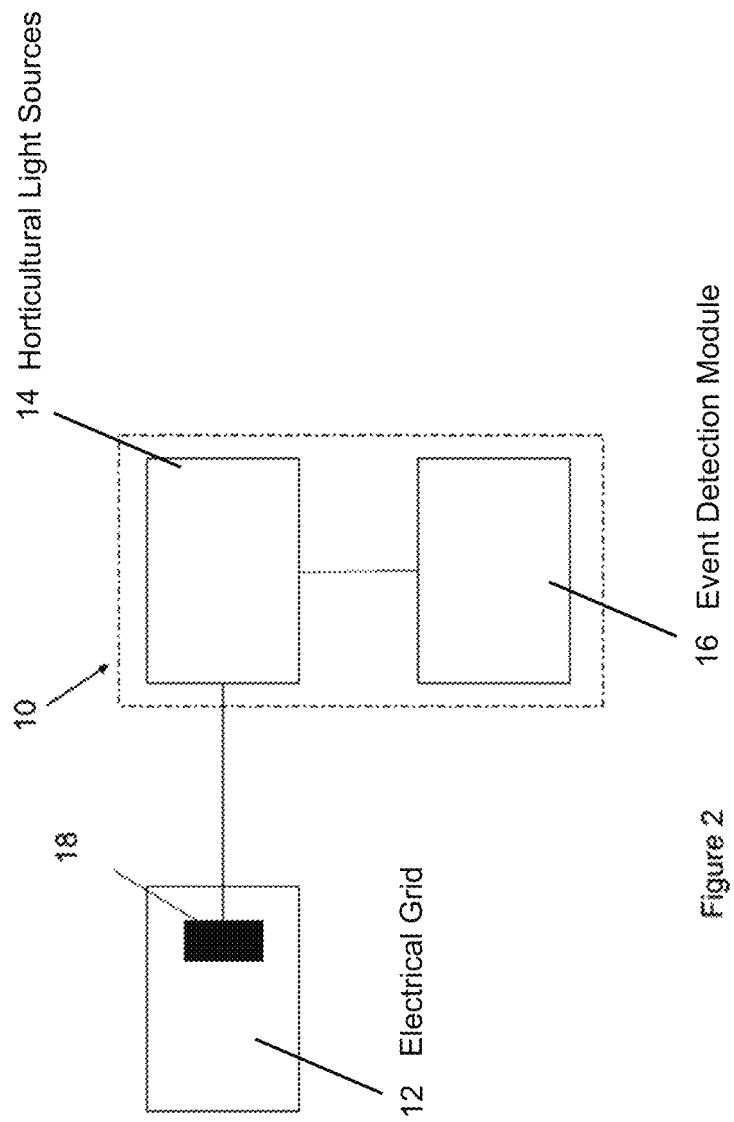
FIG. 2 shows a system for managing undesired effects in an electrical grid, in accordance with another embodiment.
Figure 3:
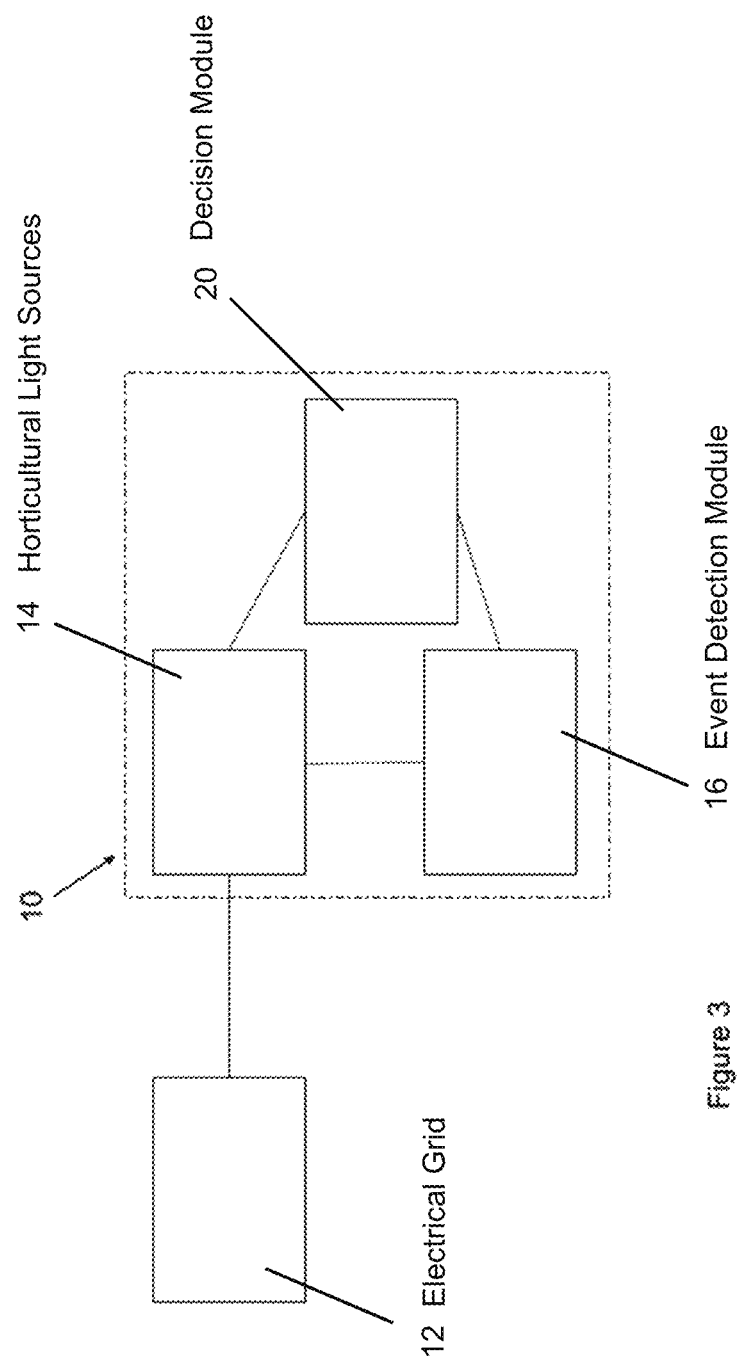
FIG. 3 shows a system for managing undesired effects in an electrical grid, in accordance with another embodiment.

In some embodiments, such as the one illustrated in FIG. 2, each horticultural light source 14 is associated with at least one dedicated power supply 18. The dedicated power supply 18 may have an "on" state and an "off" state. In some embodiments, the dedicated power supply may have a "stand-by" state (sometimes referred to a "stand-by" mode). In some embodiments, each horticultural light source 14 may include one dedicated power supply 18. In other embodiments, each horticultural light source 14 may include a plurality of dedicated power supplies. In some embodiments, the illumination instructions may cause a gradual load flattening through the power supplies of the horticultural light sources 14. In some embodiments, the illumination instructions may cause a decrease or a reduction of the power usage of at least one horticultural source 14 through a corresponding power supply.

In some embodiments, the event detection module 16 may be configured to receive a set of inputs. The set of inputs may be representative of a power usage profile and/or a spectral density distribution of each of the horticultural light sources 14. The event detection module 16 may be also configured to output an estimation of an anticipated power usage.

Figure 4:
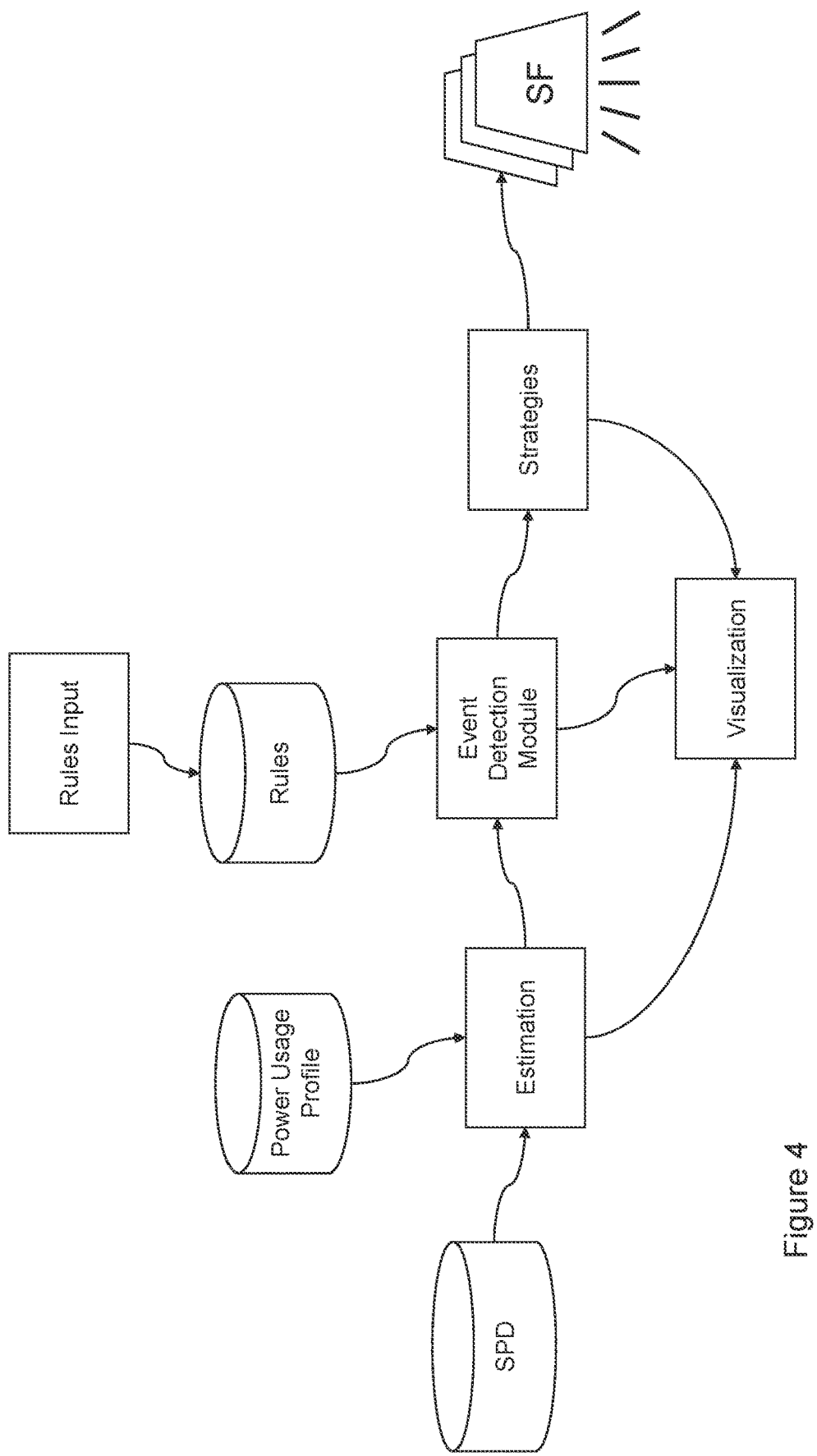
FIG. 4 shows an implementation of the techniques described herein.

In some embodiments, such as the one illustrated in FIG. 4, the system 10 may include a decision module 20 in data communication with the event detection module 16 and operatively connected to the horticultural light sources 14. The decision module 20 may be configured to receive the power usage of the horticultural light sources 14 or an estimation thereof and rule(s) associated with requirements of the electrical grid 12.

In some embodiments, the system 10 may include a visualization module or a display in data communication with the event detection module 16. The visualization module is configured to display at least one of the power usage and the evolution of the power usage of the horticultural light sources 14.

In some embodiments, the undesired effects may be mitigated using a gradual load flattening strategy, which may be useful to reduce power-line flicker(s).

In some embodiments, the undesired effects may be mitigated using a collective shutdown strategy. For example, such a strategy may include coordinating the power usage of the horticultural light sources 14 to introduce gradual increments and/or decrements of the total power usage of the horticultural light sources 14.

In some embodiments, horticultural zone(s) may be defined within the horticultural structure, and the undesired effects may be mitigated using progressive intra-zones on/off transitions and/or progressive inter-zones on/off transitions.

There is also provided a method for managing undesired effects in an electrical grid. The method includes determining, with an event detection module operatively connected to a plurality of horticultural light sources, a power usage of the plurality of horticultural light sources, the power usage being based on illumination conditions; detecting an event affecting the illumination conditions; determining whether the event causes the undesired effects in the electrical grid, based on an evolution of the power usage of the plurality of horticultural light sources in response to the event, and sending illumination instructions to the plurality of horticultural light sources to adjust the power usage of the plurality of horticultural light sources, if the event causes the undesired effects.

In some embodiments, the undesired effects include at least one rapid voltage change.

In some embodiments, the undesired effects include at least one flicker.

In some embodiments, the undesired effects are determined based on requirements of the electrical grid.

In some embodiments, the requirements of the electrical grid include at least one target associated with power-line flickers.

In some embodiments, the requirements of the electrical grid include at least one target associated with rapid voltage changes.

In some embodiments, the illumination instructions cause a gradual load flattening.

In some embodiments, the illumination instructions cause a decrease or a reduction of the power usage of at least one horticultural source from the plurality of horticultural light sources.

In some embodiments, some steps of the proposed methods are implemented as software instructions and algorithms, stored in computer memory and executed by processors. It should be understood that computers are therefore required to implement to proposed system, and to execute the proposed method. In other words, the skilled reader will readily recognize that steps of various above-described methods can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

In some embodiments, the transmission of the signals between the modules or components of the systems having been described may rely on different protocols and methods. For example, and without being limitative, the protocols and methods may involve internet communications, streaming, cloud storage, private network, server(s), and/or any combinations thereof. In some embodiments, the signals being sent and/or received by modules or components of the systems having been described may be standardized or meet the requirements of any relevant norms. It should be noted that the expression "signals" also encompass the illumination instructions and the control signals having been herein described.

An embodiment of the system having being herein described is presented in FIG. 4.

In accordance with another aspect of the present description, there is provided a non-transitory computer readable storage medium having stored thereon computer executable instructions that, when executed by a processor, cause the processor to perform the methods that have been previously described. The non-transitory computer storage medium can be integrated to the systems or assemblies that have been described in the present description. The non-transitory computer storage medium could otherwise be operatively connected with the systems or assemblies. In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

EXAMPLES

Now that different embodiments of the technology have been described, a nonlimitative example illustrating a potential implementation of the techniques will be presented. It should be noted that this example serves an illustrative purpose only and should therefore not be considered limitative.

This example relates to techniques for managing events such as flickers and RVC according to Dutch standards.

A greenhouse used for indoor growing of plants or crops that is based in Europe should follow local regulations when it comes to RVCs and power-line flickers. The greenhouse lighting system may be equipped with a power regulation mechanism or module to prevent, minimize or control RVCs and flickers in the electrical grid.

As previously mentioned, RVC is a visible change in brightness of light sources due to rapid fluctuations in the voltage of the power supply. The voltage drop may be generated over the source impedance of the grid by the changing load current resulting from the variations in the intensity and spectral rendering of the greenhouse lamp fixtures during the photoperiod. These fluctuations in time may generate flickers. Power-line flickers are known to have a negative impact on health. RVCs are known to have a negative impact on the power grid (i.e., the provider's network).

In some embodiments, the greenhouse may rely on the use of supplemental lighting. The characteristics of the supplemental lighting (e.g., SPD, intensity, and many others) are determined based on readings obtained from sensors, which may include one or more spectrometers or a network of spectrometers. During sunny days, when there is also an alternating presence of dense clouds, changes in illumination conditions may happen quickly and often, which may affect the compensation provided by the supplemental lighting. This change in illumination conditions is associated with significant variations of the current load.

In absence of additional protection mechanism (such as the one having been herein described), the sudden load variations would create flickering in the power distribution network and would have a negative impact on the power grid, which may affect other users connected to the same power grid.

In some jurisdictions, rules may be in force to limit or at least reduce flickering. For example, in the Netherlands, the electricity providers follow the European regulation EN 50160, which asserts that the Long Term Flicker Perceptibility (Plt) should be equal or lower than 1 for 95% of working time (i.e., Plt≤1, 95% of time).

Of note, this regulation also specifies that, under normal conditions, a RVC should not exceed 5% Un, and that a change of up to 10% Un with a short duration may be tolerated in some circumstances.

The operator of the greenhouse may face other considerations related to lighting. For example, the growth plan of a given plant or crop may require specific DLI targets to be achieved. In some embodiments, the techniques having been herein described may be implemented so that the DLI targets are reached while respecting the regulations associated with flickers or RVCs.

In some embodiments, the operator may have configured the system for managing flickers and/or RVCs, or component(s) of the system, as follows:

Plt target (≤): 1, 95%

RVC target: 5%

Maximum RVC target: 10%, maximum daily occurrences per day: 2

DLI Target (mol m−2 d−1): 17, priority: 1

The system may be configured to perform a continuous estimation of the LED-level and lamp-level power usage and, when changes are detected in the inputted SPD, the regulation system can monitor and detect material changes in the estimated total power consumption. Such changes, for instance, could occur during clouds passages as the need for supplemental lighting may increase.

When material changes are indeed detected, the system can alter or adjust the SPD to introduce a smooth transition and flatten the changes in SPD in a manner that reduces or eliminate the material change, while achieving regulations requirements as configured in the system rules. This may be achieved while staying as close as possible to the daily integral targets. The system is configured to consider the prioritization weight in the decision process, in order to prioritize decisions.

The technique according to this example allows the operator to operate a non-linear and frequently changing power load demand (generated by a large pool of lamps generating horticultural light having a variable spectrum and a variable intensity profile), while staying within the guidelines for RVC and flickers in electric power systems in the Netherlands.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the present disclosure.

The invention claimed is:

1. A system for managing undesired effects in an electrical grid, the system comprising:
   a plurality of horticultural light sources operatively connected to the electrical grid; and
   an event detection module operatively connected to the plurality of horticultural light sources, the event detection module being configured to:
      determine a power usage of the plurality of horticultural light sources, the power usage being based on illumination conditions;
      detect an event affecting the illumination conditions;
      determine whether the event causes the undesired effects in the electrical grid, based on an evolution of the power usage of the plurality of horticultural light sources in response to the event, the undesired effects being produced by operation of the plurality of horticultural light sources and being subsequently injected into the electrical grid; and
      send illumination instructions to the plurality of horticultural light sources to adjust the power usage of the plurality of horticultural light sources, if the event causes the undesired effects, to avoid injecting the undesired effects into the electrical grid.

2. The system of claim 1, wherein the undesired effects include at least one rapid voltage change.

3. The system of claim 1, wherein the undesired effects include at least one flicker.

4. The system of claim 1, wherein the undesired effects are determined based on requirements of the electrical grid.

5. The system of claim 4, wherein the requirements of the electrical grid comprise at least one target associated with power-line flickers.

6. The system of claim 4, wherein the requirements of the electrical grid comprise at least one target associated with rapid voltage changes.

7. The system of claim 1, wherein the illumination instructions cause a gradual load flattening.

8. The system of claim 1, wherein the illumination instructions cause a decrease or a reduction of the power usage of at least one horticultural source from the plurality of horticultural light sources.

9. A method for managing undesired effects in an electrical grid, the method comprising:
   determining, with an event detection module operatively connected to a plurality of horticultural light sources, a power usage of the plurality of horticultural light sources, the power usage being based on illumination conditions;
   detecting an event affecting the illumination conditions;
   determine whether the event causes the undesired effects in the electrical grid, based on an evolution of the power usage of the plurality of horticultural light sources in response to the event, the undesired effects being produced by operation of the plurality of horticultural light sources and being subsequently injected into the electrical grid; and
   sending illumination instructions to the plurality of horticultural light sources to adjust the power usage of the plurality of horticultural light sources, if the event causes the undesired effects, to avoid injecting the undesired effects into the electrical grid.

10. The method of claim 9, wherein the undesired effects include at least one rapid voltage change.

11. The method of claim 9, wherein the undesired effects include at least one flicker.

12. The method of claim 9, wherein the undesired effects are determined based on requirements of the electrical grid.

13. The method of claim 12, wherein the requirements of the electrical grid comprise at least one target associated with power-line flickers.

14. The method of claim 12, wherein the requirements of the electrical grid comprise at least one target associated with rapid voltage changes.

15. The method of claim 9, wherein the illumination instructions cause a gradual load flattening.

16. The method of claim 9, wherein the illumination instructions cause a decrease or a reduction of the power usage of at least one horticultural source from the plurality of horticultural light sources.

17. A system for managing undesired effects in an electrical grid, the system comprising:
   a plurality of horticultural light sources operatively connected to the electrical grid; and
   an event detection module operatively connected to the plurality of horticultural light sources, the event detection module being configured to:
      determine a power usage of the plurality of horticultural light sources, the power usage being based on illumination conditions;
      detect an event affecting the illumination conditions;
      determine whether the event causes the undesired effects in the electrical grid, based on an evolution of the power usage of the plurality of horticultural light sources in response to the event; and
      send illumination instructions to the plurality of horticultural light sources to adjust the power usage of the plurality of horticultural light sources, if the event causes the undesired effects; and
   a decision module in data communication with the event detection module and operatively connected to the plurality of horticultural light sources, the decision module being configured to receive the power usage of the plurality of horticultural light sources, an estimation of the power usage of the plurality of horticultural light sources thereof, and/or at least one rule associated with requirements of the electrical grid.

* * * * *